Patented Sept. 12, 1950

2,522,436

UNITED STATES PATENT OFFICE 2,522,436

THIOPHENE DERIVATIVES

William S. Emerson and Tracy M. Patrick, Jr., Dayton, Ohio, assignors to Monsanto Chemical Company, St. Louis, Mo., a corporation of Delaware No Drawing. Application August 5, 1948, Serial No. 42,734

8 Claims. (Cl. 260—306)

1

This invention relates to a family of new chemical compounds derived from thiophene which have unusual value as accelerators for rubber compositions.

The primary purpose of this invention is to develop new products from thiophene. Another purpose is to prepare new and useful rubber chemicals.

The new chemical compounds have the structure:

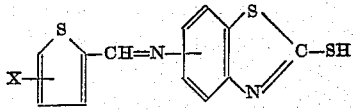

wherein X is a radical of the group consisting of halogen, alkyl and hydrogen, and including chlorine, fluorine, bromine, iodine, methyl, ethyl, n-propyl, isopropyl, n-butyl, isobutyl, t-butyl amyl and other homologues. The alkyl groups of particular utility are those having up to four carbon atoms.

The new compounds may be prepared by mixing the desired thiophenealdehyde with an amino substituted mercaptobenzothiazole and heating them in the presence of a suitable solvent, such as anhydrous ethanol, at the reflux temperature. In place of ethanol, any common, non-reactive solvent may be used, such as methanol, propanol, butanol, benzene, toluene, xylene, dioxane, chlorobenzene, and ethyl acetate. For the higher molecular weight, less reactive compounds, it is desirable to use a water-immiscible solvent so that the evolved water may be removed by azeotropic distillation. The reaction also may be effected in the absence of a solvent, although under such conditions, it proceeds more slowly. The resulting compounds are recovered from the reaction mass and purified by recrystallization.

The new compounds have particular utility as vulcanization accelerators for natural and synthetic rubber compositions.

Further details are set forth with respect to the following example.

Example

A reaction flask provided with a reflux condenser was charged with 1.1 gram of 2-thiophenealdehyde, 1.8 grams of 6-amino-2-mercaptobenzothiazole, and 25 cc. of absolute ethanol. The reaction mixture was boiled at reflux temperature for one and one-half hours. An additional 25 cc. portion of ethanol was added and the resulting slurry was filtered while hot. The residue was washed with ethanol and dried. After recrystallization three times from a pyridine solution, a product having a melting point of 255–256° C. was obtained and identified as 2'-thenal-6-amino-2-mercaptobenzothiazole.

The invention is defined by the following claims.

We claim:

1. A chemical compound having the structure:

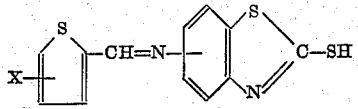

wherein X is a radical of the group consisting of halogen, alkyl and hydrogen.

2. A chemical compound having the structure:

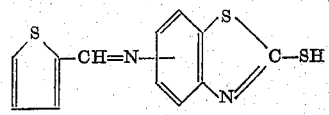

3. 2' - thenal - 6 - amino - 2 - mercaptobenzothiazole.

4. (5' - chloro - 2' - thenal) - 6 - amino - 2-mercaptobenzothiazole.

5. (5' - methyl - 2' - thenal) - 6 - amino - 2-mercaptobenzothiazole.

6. A method of preparing a thenalaminomercaptobenzothiazole which comprises reacting a thiophenealdehyde having the structure:

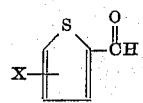

wherein X is a radical of the group consisting of halogen, alkyl and hydrogen, with an aminomercaptobenzothiazole.

7. A method of preparing 2'-thenalaminomercaptobenzothiazole which comprises mixing 2-thiophenealdehyde and an aminomercaptobenzothiazole, heating in the presence of a solvent for the reactants, and separating the compound so formed.

8. A method of preparing 2'-thenal-6-amino-2-mercaptobenzothiazole, which comprises mixing thiophenealdehyde with 6-aminomercaptobenzothiazole, heating the mixture in the presence of ethyl alcohol, and separating the product by crystallization.

WILLIAM S. EMERSON.
TRACY M. PATRICK, Jr.

No references cited.